United States Patent [19]

Kuramochi et al.

[11] Patent Number: 5,045,829
[45] Date of Patent: Sep. 3, 1991

[54] PRESSURE SENSOR UTILIZING EXTENSION TYPE CONDUCTIVE RUBBER

[76] Inventors: Hiroshi Kuramochi, 20-34-603, Kamiaokinishi 1 Chome; Yasuo Okuda; Sigeyosi Ogihara, both of c/o Kabushiki Kaisha Fine Rubber Kenkyuusho, 3-21 Namiki 3 Chome, all of Kawaguchi-shi, Saitama-ken, Japan

[21] Appl. No.: 487,133

[22] Filed: Mar. 2, 1990

[51] Int. Cl.$^5$ ............................................. G01C 10/10
[52] U.S. Cl. ........................................ 338/36; 338/42; 338/6; 73/862.62; 73/725
[58] Field of Search ............... 338/36, 42, 47, 4, 6; 73/862.65, 862.62, 862.04, 706, 718, 724, 726, 727, 754, 725

[56] References Cited

U.S. PATENT DOCUMENTS

| | | | |
|---|---|---|---|
| 3,781,751 | 12/1923 | Sulger, Sr. | 338/42 |
| 3,793,495 | 2/1974 | Heap | 338/42 |
| 3,899,766 | 8/1975 | Mermelstein | 338/42 |
| 3,981,197 | 9/1976 | Lieber et al. | 338/42 X |
| 4,876,893 | 10/1989 | Kato et al. | 338/42 X |

*Primary Examiner*—Marvin M. Lateef
*Attorney, Agent, or Firm*—M. Reid Russell

[57] ABSTRACT

A pressure sensor that utilizes an extension type conductive elastomer that will exhibit a decrease in its electrical resistance in response to an extension thereto. Like sheets of the conductive elastomer and an electrically insulative elastomer are overlaid and sandwiched between supporting members within a housing of the pressure sensor. The housing and each supporting member are preferably cylindrical or ring shaped, and which conductive elastomer has a pair of spaced electrodes electrically connected thereto at opposite points on its periphery. The periphery of the electrically insulative elastomer is squeezed continuously in a circle between the supporting members, while that of the conductive elastomer that includes recesses is squeezed therebetween discontinuously in the sections between the electrodes. When a pressure is applied to the contacting elastomers, they will be convexly deformed away from the pressure both experiencing an extension or stretching in the portions thereof that are not squeezed together. Thereby, the electrical resistance across the conductive elastomer as measured across the electrodes, will decrease in an analog fashion in response to the applied pressure. Accordingly, the applied pressure can be directly sensed as a change in electrical resistance as measured across the electrodes.

7 Claims, 3 Drawing Sheets

PRESSURE SENSOR UTILIZING EXTENSION TYPE CONDUCTIVE RUBBER

BACKGROUND OF THE INVENTION

1. Field of the Invention

This invention relates to pressure sensors that sense a fluid pressure such as a air pressure and more particularly to a pressure sensor that utilizes an extension type conductive elastomer that, when extended, will change its electrical resistance value in response to an extension thereof, and thereby in response to the magnitude of the extending force as well.

2. Prior Art

A pressure sensor that utilizes a pressure sensitive conductive rubber (PCR) in its construction is well known. Such pressure sensitive conductive rubber, as heretofore in use however, while it changes its electrical resistance when compressed, will rupture when a tensile force is applied thereto. Therefore, it should be used in such a manner that it will be compressed to sense a pressure, but never extended. However, generally, an elastomer such as a rubber, will have elasticity modules in compression that is considerably larger than it exhibits in tension, and this means that a smaller compressive force cannot cause a deformation to a significant extent in an elastomer. Accordingly, the conventional pressure sensor utilizing a pressure sensitive conductive rubber cannot be utilized for sensing a fluid pressure such as air pressure. On the same account, in an elastomer, practically, a large deformation cannot be caused by compression, as an extremely great force is required to cause it. Therefore, the conventional pressure sensor utilizing a pressure sensitive conductive rubber is limited to sensing a pressure through a change of its electrical resistance for a very small compressive deformation only. This limitation makes it impractical for use in sensing a pressure where a high degree of accuracy is required. Additionally, pressure sensitive rubber exhibits large hysteresis as a result of application of a compressive force thereto, further prohibiting accurate sensing.

As a consequence, pressure sensitive conductive rubbers have heretofore been limited in application to devices, such as a switching device, that sense a pressure applied thereto through a solid substance or semi-solid substance such as a finger or foot of a human body and that sense the presence or absence of pressure in an on/off fashion only, and cannot sense an applied pressure in an analog fashion as does the present invention.

SUMMARY OF THE INVENTION

It is a primary object of the present invention to provide a pressure sensor that can sense an applied change in fluid pressure with high degree of accuracy in an analog manner.

Another object of the present invention is to provide a pressure sensor that is simple to construct and is inexpensive to manufacture.

Still another object of the present invention is to provide a pressure sensor that can be utilized by connecting its output directly to a device, such as a computer, to receive the sensor's output signal that represents a sensed pressure, without a need for signal amplification or processing.

In accordance with the above-described objects, the present invention is in a pressure sensor that utilizes an extension type conductive elastomer. The preferred elastomer, when extended, exhibits a decrease in its electrical resistance responsive to the magnitude of force applied thereto so as to cause that extension. A preferred extension type conductive elastomer for example, is disclosed in a U.S. Patent Application of one of the present inventors, entitled "Extension Type Conductive Rubber and Process for Making and Method for Using Same" filed Feb. 21, 1990, Ser. No. 07/482,875 that is pending, that is formed by impregnating a cross-linked conductive silicone rubber, which contains suspended carbon particles, with a silicone oil that is compatible with the selected conductive silicone rubber.

In the pressure sensor of the present invention, like sized sheets of a conductive elastomer and an electric insulating elastomer are laid over one another and are impressed together between first and second supporting members. Each of which supporting member has a cylindrical or ring shape, and each is made of an electric insulating material. A pair of electrodes are electrically connected to the conductive elastomer at spaced peripheral points, with the insulating elastomer squeezed therebetween and extending continuously around the peripheral thereof. The conductive elastomer is compressed by the insulating elastomer, discontinuously into the area between the electrodes that contain spaced recesses formed radially into the conductive elastomer.

The electrodes may be mounted to one or to each of the supporting members so as to be pressed against the conductive elastomer at the periphery thereof. So arranged, fluid pressure such as air pressure is appropriately applied to the contacting elastomers, that pressure will not leak out through the conductive elastomer recesses, as the electric insulating elastomer is squeezed between the supporting members continuously around the peripheral thereof. Therefore, both the electric insulating elastomer and conductive elastomer will be convexly deformed together in those portions or areas of each that are not being squeezed, providing a uniform extension therein in response to applied pressure. The electrical resistance across the electrodes will thereby decrease in response to the applied pressure. Thus, the applied pressure can be sensed as a change in electrical resistance measured across the electrodes, or the equivalent, such as the voltage measured across the electrodes or the electric current that passes through the electrodes.

Since an elastomer, in general, is more deformable in tension than in compression, as set out above, a greater extension can be imparted to an extension type conductive elastomer in a tensile induced deformation than in a compressive deformation. Accordingly, the pressure sensor of the present invention that employs a tensile force induced deformation can sense a pressure with high degree of accuracy in an analog fashion. Additionally, an extension type conductive elastomer will not exhibit a significant hysteresis when subjected to a tensile deformation further providing for accurate sensing.

It should be noted that, in general, an extension type conductive elastomer also decreases its electrical resistance when compressed. Accordingly, when the extension type conductive elastomer of the present pressure sensor is squeezed continuously, all around the peripheral thereof, an electric current introduced therein will pass only through the squeezed circular portion of that conductive elastomer which electrical resistance is lowered by that squeezing. Whereas, the electrical resistance across the electrodes will not change even though other portions of the conductive elastomer suffer an extension in response to an applied pressure so as to change the electrical resistance thereof, precluding measuring pressure changes. Mounting one of the electrodes onto the center of the extension type conductive elastomer could eliminate the above-mentioned problem, but such would be undesirable for manufacture, use and maintaining the sensor.

In the pressure sensor of the present invention, however, the squeezed portions of the conductive elastomer between the electrodes are arranged to be discontinuous in the sections between the electrodes. Thereby, an electric current that is passed across the electrodes changes in response to an applied pressure, the pressure sensor thereby functions to sense a change in applied pressure.

BRIEF DESCRIPTION OF THE DRAWINGS

These and other objects and features of the present invention will become more apparent from the following description in which the invention is described in detail in conjunction with the accompanying drawings.

BRIEF DESCRIPTION OF THE EMBODIMENT

Figure 1:
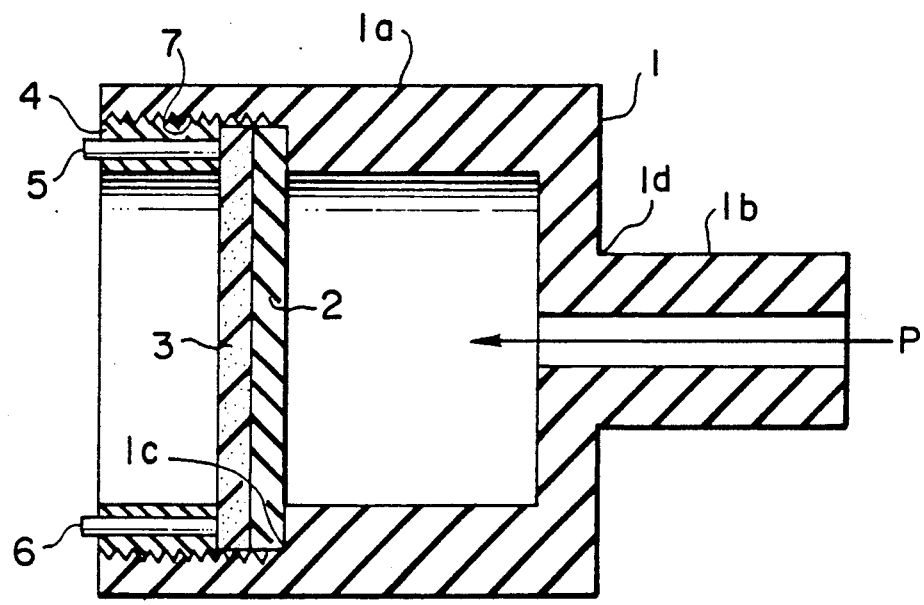
FIG. 1 is a longitudinally sectional view of a pressure sensor according to a first embodiment of the present invention.
Figure 2:
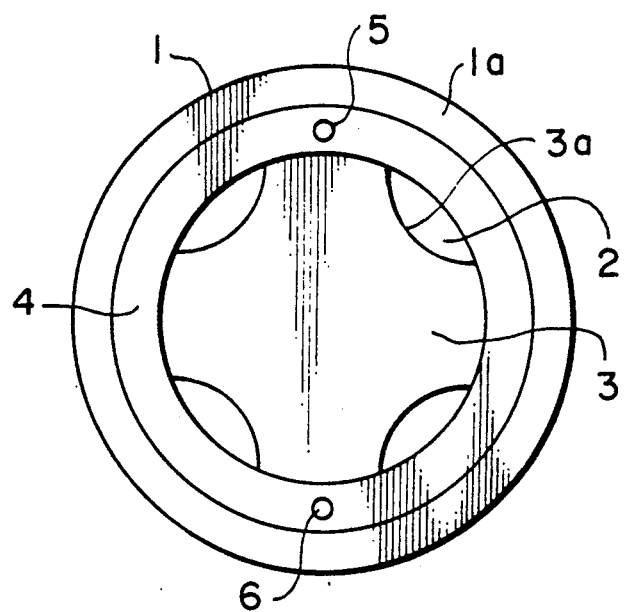
FIG. 2, is a side elevation view of the embodiment of FIG. 1.

FIGS. 1 and 2 show a first embodiment of a pressure sensor of the present invention. The pressure sensor of this embodiment includes a housing 1 that is shown as a stepped cylinder and is preferably constructed of an electric insulating material. The cylinder includes large diameter portion 1a, and smaller diameter portion 1b, with a right angle shoulder 1d extending therebetween. A fluid pressure P, such as a air pressure, to be sensed is shown as an arrow P that is pointing into the pressure sensor through a longitudinal opening formed through the cylinder smaller diameter portion 1b and into the housing 1. The greater diameter portion 1a is open across its end that is opposite to the smaller diameter 1b, and the inner area of which cylinder threaded is stepped inwardly from a greater diameter portion at 7 that extends from that open end, to the step that is a right angle shoulder 1c. The thread formed on the inner surface of the greater diameter portion 1a between the open end and the shoulder 1c is to receive a fastening ring 4 turned therein. The fastening ring 4 is preferably formed from an electrically insulative material and includes threads formed on the outer surface thereof. Edges of separate sheets of an electrically insulative elastomer or rubber layer 2 and an extension type conductive elastomer of rubber layer 3, are fitted as a stack into the greater diameter portion 1a, and are sandwiched between the fastening ring 4 and shoulder 1c.

The electric insulating rubber layer 2 is disposed against the side of the shoulder 1c, with the extension type conductive rubber engaging the surface of the fastening ring 4.

Figure 3:
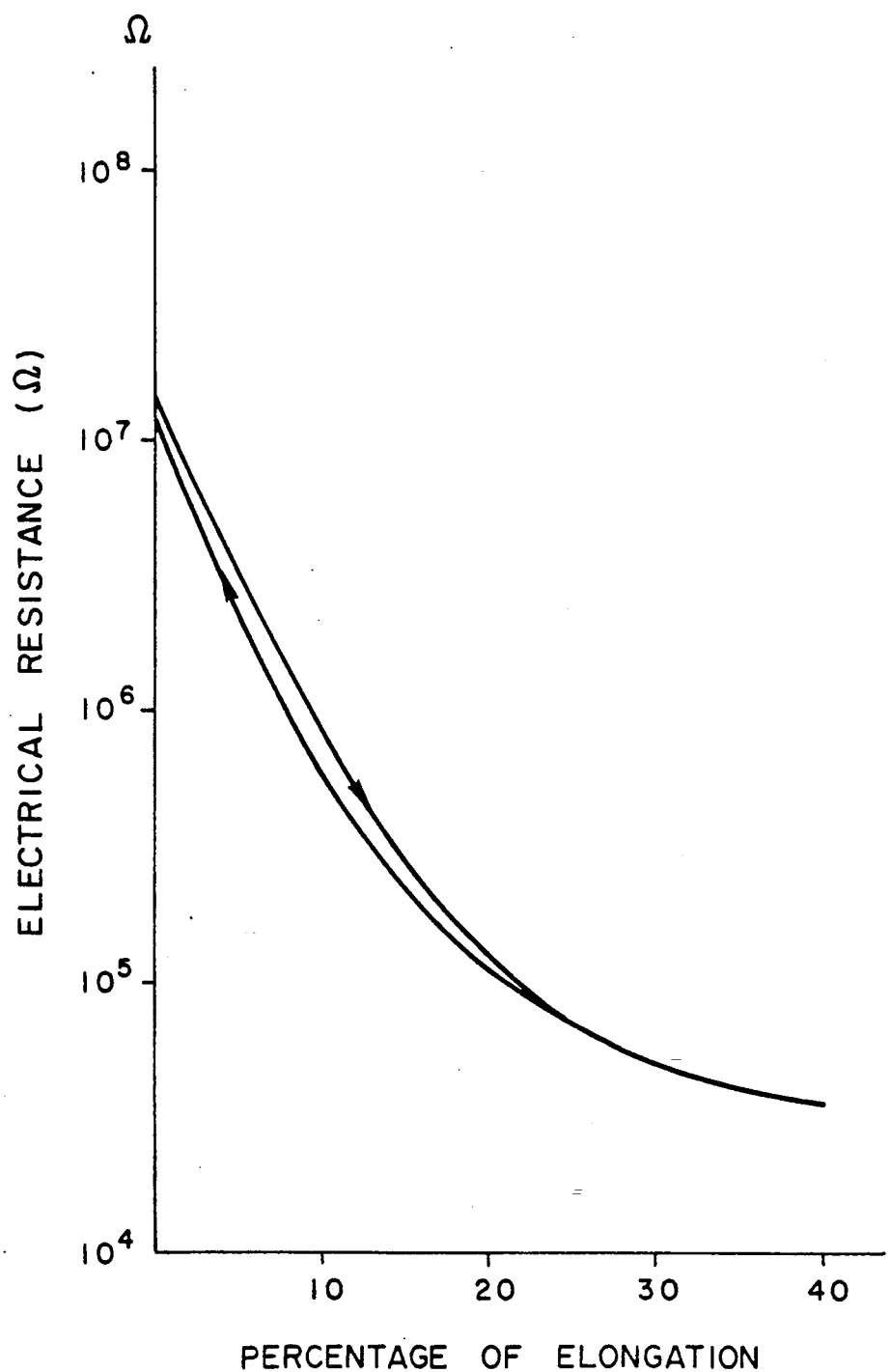
FIG. 3, is a characteristic curve diagram showing the relationship between the percentage of elongation and the electrical resistance of an extension type conductive rubber that is the same material as that utilized in the embodiment of FIGS. 1 and 2.

FIG. 3, shows a graph of a characteristic curve that illustrates relationship between the percentage of elongation and the electrical resistance of the extension type conductive rubber of the same material as the rubber layer 3, that is preferred for this embodiment. The characteristic curve was obtained by testing a test piece of the extension type conductive rubber that is 50.0 mm in length, 5.0 mm in width and 0.3 mm in thickness. As shown in the diagram, the electrical resistance value of the rubber 3 will be at its highest value when the conductive rubber 3 is at high rest before an elongating force is applied thereto, and that resistance will lower as the percentage of elongation is increased. The preferred extension type conductive rubber that has this characteristic, for example, is provided by a practice of the process as disclosed in the aforesaid U.S. Patent Application, of one of the present inventors, filed contemporaneously herewith.

Straight electrodes 5 and 6 are shown in FIGS. 1 and 2, fitted into the fastening ring 4 to be across from and parallel to one another and to the axis of the housing 1. One end of each electrodes is flushed with the surface of the fastening ring 4, and will press against the conductive rubber so as to be electrically connected thereto. The opposite end of each electrode protrudes from the fastening ring 4 for connection to a measuring device, not shown. The electrically insulative rubber layer 2, as shown, is preferably round and is sandwiched between the housing 1, shoulder 1c and the fastening ring 4 at the periphery thereof. Alternatively, the conductive rubber layer 3, as shown in FIG. 2, can be of a round shape with a plurality of semicircular radial spaced recesses 3a removed therearound such that the portions of the rubber layer 3, between the housing 1 and the fastening ring 4, will be discontinuous between the electrodes 5 and 6.

Operation of this embodiment is substantially as follows:

Absent an applied pressure in the layers 2 and 3, as illustrated by arrow P, the layers 2 and 3 will suffer no extension and thereby the electrical resistance of the conductive rubber layer 3 that is not under pressure will be at its highest value.

When, however, a positive pressure, arrow P, is applied to the rubber layers 2 and 3 through the smaller diameter portion 1b, that pressure P will not leak out through the recesses 3a of the conductive rubber layer 3, since the electric insulating rubber layer 2 is squeezed between the housing 1 and the fastening ring 4 continuously around the peripheral thereof. Accordingly, both the electrically insulative rubber layer 2 and the conductive rubber layer 3 will be convexly deformed together towards the open end of the greater diameter portion 1a of housing 1, away from the applied pressure, arrow P, in those portions or areas thereof not being squeezed, providing a uniform extension therein responsive to the applied pressure P. Thereby, the electrical resistance of the conductive rubber layer 3 in the portion or area not being squeezed will decrease in response to the applied pressure P.

While the squeezed or compressed portions of the conductive rubber layer 3, located between the housing 1 and the fastening ring 4 are discontinuous in the sections between the electrodes 5 and 6, the electric current will still pass across the electrodes 5 and 6 traveling through the conductive rubber layer 3, passing through both the squeezed portions and those portions or areas not being squeezed. The electrical resistance across the electrodes 5 and 6 will therefore change in response to the applied pressure P as the conductive rubber layer 3 is extended in the area thereof that is not squeezed, responsive to the applied pressure P. This applied pressure P can thereby be sensed with a high degree of accuracy in an analog manner through the change in electrical resistance across the electrodes 5 and 6, or through a change in an equivalent to the electrical resistance such as a voltage as measured across the electrodes or a electric current that is passed through the electrodes.

The sensitivity of the pressure sensor can be controlled by a selection of the thickness of the conductive rubber layer and/or electrically insulative rubber layer 2.

Figure 4:
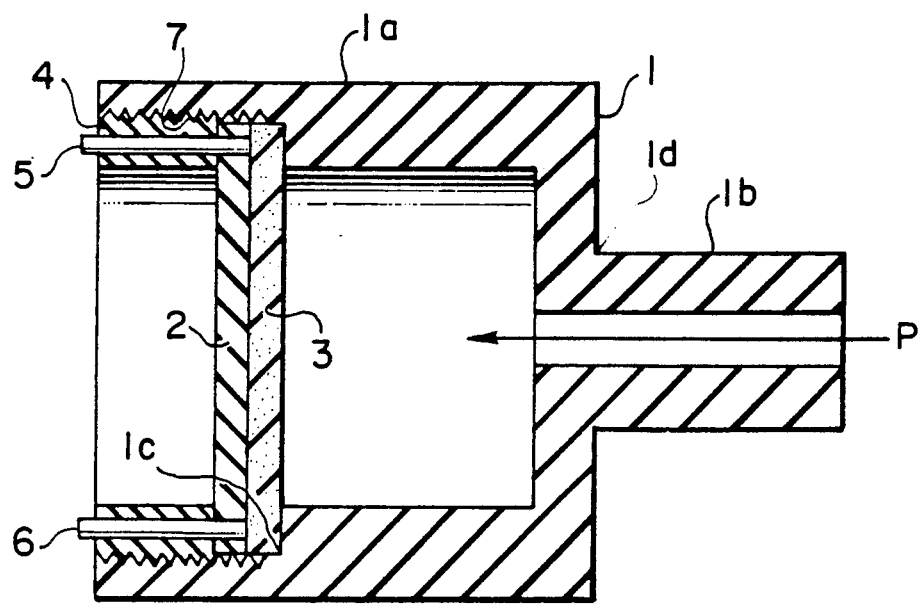
FIG. 4, is a view that is similar to that of FIG. 1, only showing a second embodiment of a pressure sensor of the present invention.

FIG. 4, shows a second embodiment of a pressure sensor of the present invention. Should utilizing the above set out first pressure sensor embodiment of FIGS. 1 and 2, the applied pressure P be negative or opposite to that shown, it will not be sensed by the pressure sensor of FIGS. 1 and 2, as only the electrically insulative rubber layer 2 will be deformed, and the conductive rubber layer 3 will remain undeformed as a result of the presence of recesses 3a therein. The embodiment of the pressure sensor of FIG. 4, is appropriate for sensing such a negative pressure. Accordingly, in this embodiment the electrically insulative rubber layer 2 and conductive rubber layer 3 are reversed. That is, the electrically insulative rubber layer 2 is disposed along side the fastening ring 4, with the extension type conductive rubber layer 3 arranged adjacent to the face of shoulder 1c and with the electrodes extending through the electrically insulative rubber layer 2 to be pressed against the surface of the conductive rubber layer 3 at one end thereof.

Figure 5:
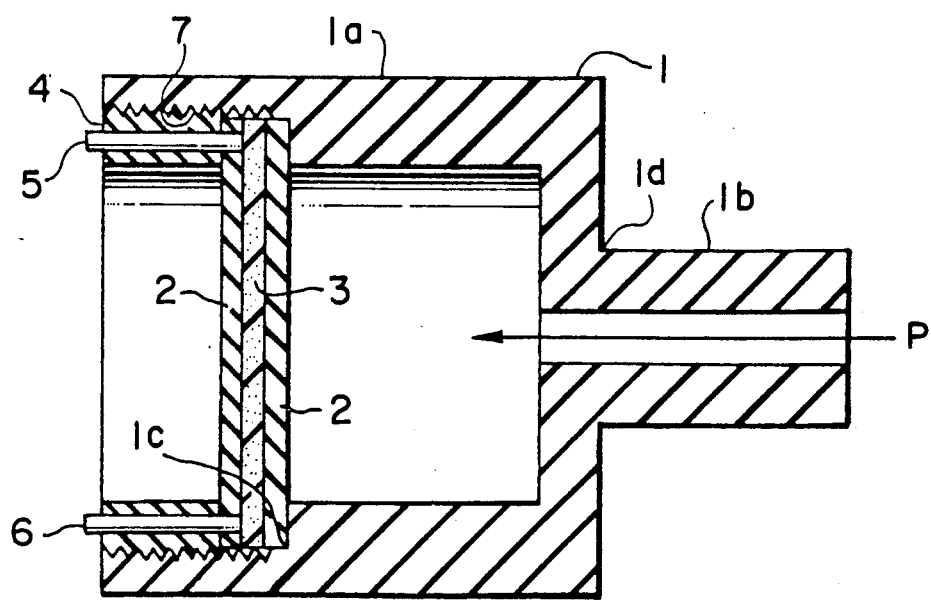
FIG. 5, is a view that is similar to those of FIGS. 1 and 4, only showing a third embodiment of a pressure sensor of the present invention.

FIG. 5, shows a third embodiment of a pressure sensor of the present invention. In this embodiment, two identical electrically insulative rubber layers 2 sandwich a conductive rubber layer 3 therebetween. The electrically insulative rubber layers 2 are squeezed between the housing 1, wall 1c, and the fastening ring 4, continuously around the peripheral thereof, the electrodes ends engaging the conductive rubber layer 3, with each electrode extending through the electrically insulative rubber layer 2 to be pressed against the surface of the conductive rubber layer 3 at one end thereof. Both positive and negative pressures can be sensed by this embodiment.

While preferred embodiments of the present invention in a pressure sensor have been shown and described herein, it should be apparent that the present disclosure is made by way of example only and that variations thereto are possible within the scope of the disclosure without departing from the subject matter coming within the scope of the following claims and reasonable equivalency thereof, which claims we regard as our invention.

We claim:

1. A pressure sensor comprising: a housing; a sheet of an electrically insulative elastomer; a like-shaped sheet of an extension type conductive elastomer overlaying said electrically insulative elastomer and having a plurality of spaced radial recesses formed around the periphery thereof, which extension type conductive elastomer, when extended, exhibits a decrease in its electrical resistance value in response to the magnitude of an applied extension; first and second spaced electrodes that are each electrically connected to said extension type conductive elastomer at the periphery thereof; and first and second support means, each of which are cylindrical or ring shape and are made of an electrically insulative material for mounting in said housing to sandwich said overlaying extension type conductive elastomer and said electrically insulative elastomer around their periphery, with said electrically insulative elastomer squeezed therebetween continuously around the periphery thereof and with said extension type conductive rubber squeezed therebetween discontinuously around the periphery thereof in the sections between the electrodes.

2. A pressure sensor as set forth in claim 1, further including sandwiching the extension type conductive elastomer between first and second said electrically insulative elastomers.

3. A pressure sensor as set forth in claim 1, wherein the extension type conductive elastomer is an extension type conductive rubber.

4. A pressure sensor as set forth in claim 1, wherein the electrically insulative elastomer is an electric insulating rubber.

5. A pressure sensor as set forth in claim 1, wherein the electric insulation elastomer has a round shape.

6. A pressure sensor as set forth in claim 1, wherein the extension type conductive elastomer has a round shape.

7. A pressure sensor as set forth in claim 1, wherein the first and second electrodes are mounted in one or each of the first and second support member means so as to have one end of each in close engagement with the extension type conductive elastomer at spaced points on the periphery thereof.

* * * * *